April 15, 1930.　　　　A. R. PRIBIL　　　　1,754,801
LUBRICATOR FOR TROLLEY CONVEYERS
Filed June 9, 1928　　　2 Sheets-Sheet 1
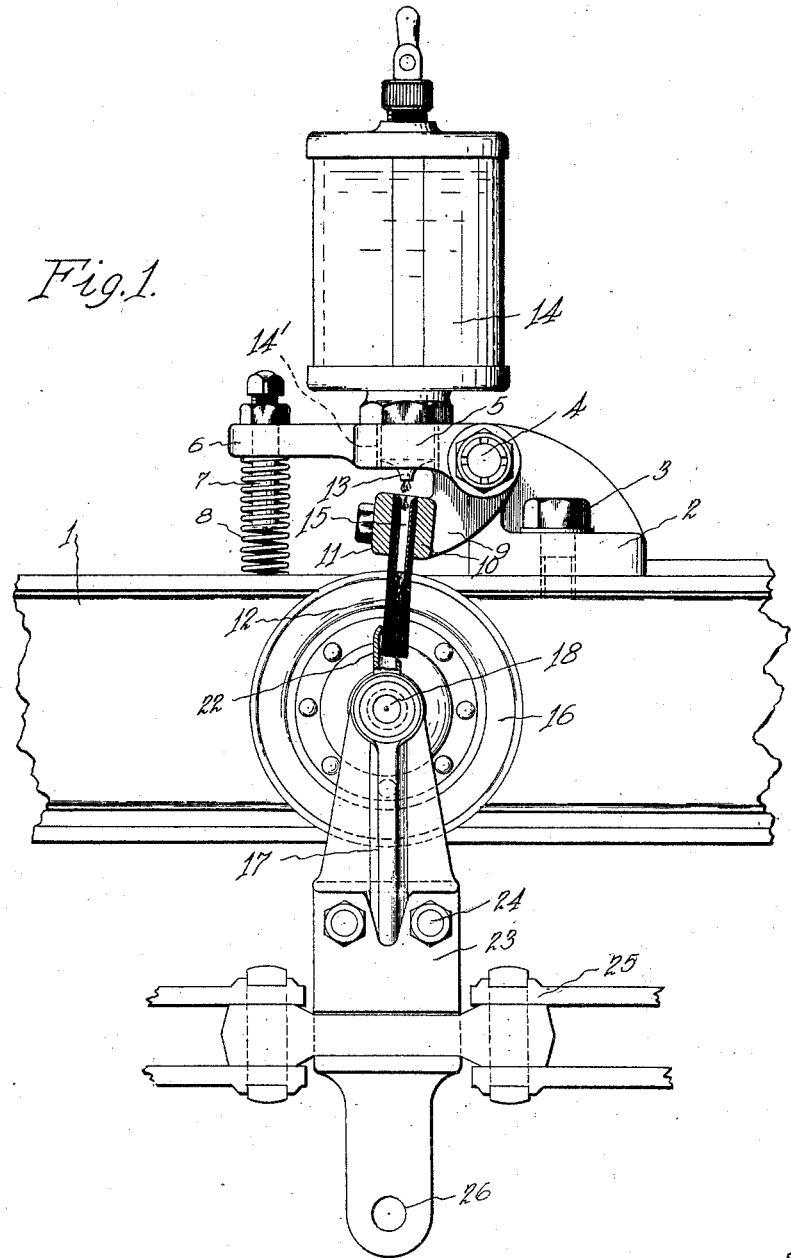
Inventor
Alexis R. Pribil
By
Attorneys

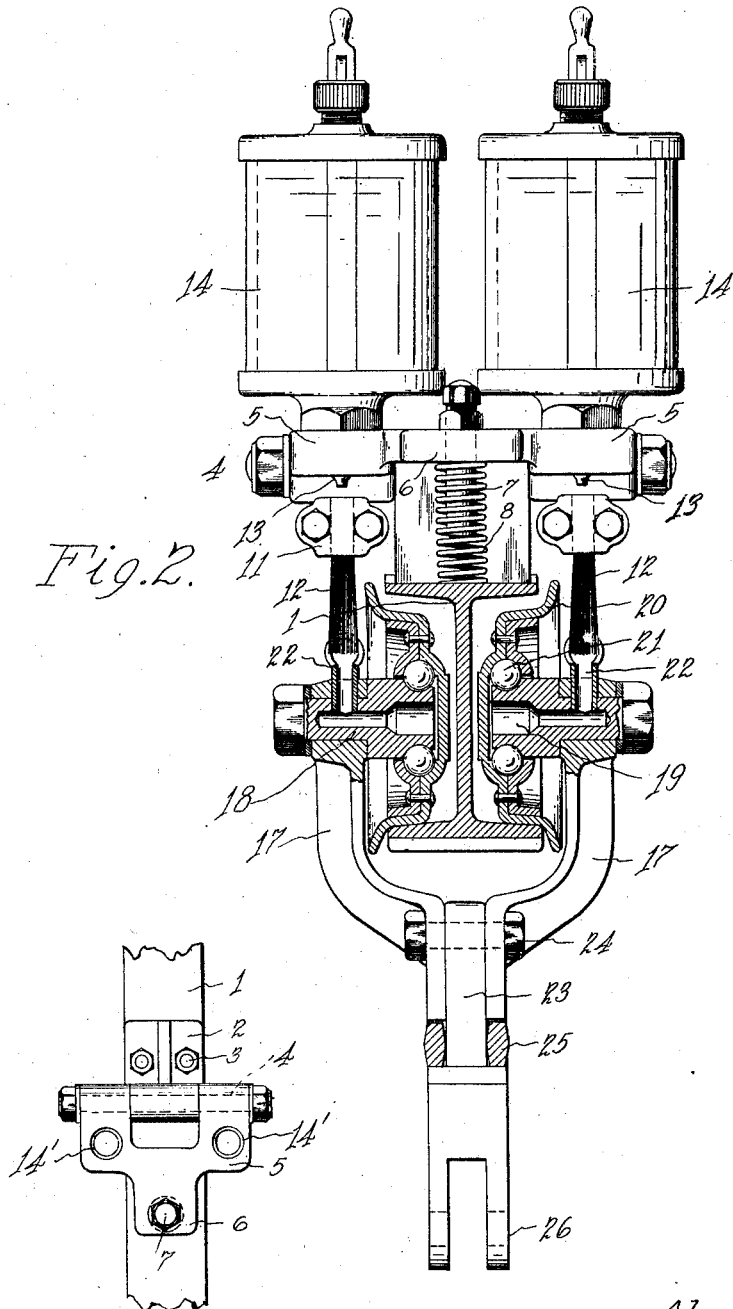

Patented Apr. 15, 1930

1,754,801

UNITED STATES PATENT OFFICE

ALEXIS R. PRIBIL, OF SAGINAW, MICHIGAN

LUBRICATOR FOR TROLLEY CONVEYERS

Application filed June 9, 1928. Serial No. 284,252.

The present invention pertains to a novel automatic lubricator for trolley conveyers.

The principal object is to provide an automatic lubricator for the type of trolley conveyers employed in factories in conveying goods from one department to another. The conveyers are extensively used in the automobile industry by the systems of mass production; they are found in general use in baking enamelled products and in baking and glazing clay products.

The conveyers in passing from one department to another are necessarily passed at times through tunnels while at other times they are overhead a sufficient distance so as not to interfere or obstruct the work of the department through which they are passing. This method makes effective lubrication exceedingly difficult. The conveyers employed in the baking industries are subject to intense heat and for this reason are not accessible for lubricating purposes. Lubrication by grease cups under heated conditions is highly unsatisfactory for in the conditions recited it is practically impossible to operate the grease cups.

The present invention has as a further object the lubrication of the conveyer trolleys under the adverse conditions recited. The lubricant is supplied from containers which are placed at suitable intervals upon the suspended trolley rail. A novel feeding mechanism is provided, consisting of brushes saturated with a lubricant supplied from the containers and adapted to be wiped by spouts attached to the trolley, the lubricant passing from the spouts to the bearings of the trolleys, the motion of the conveyer supplying the lubricant and the only manual operation being the filling of the lubricant containers.

With these objects in view the invention consists essentially of the elements to be more particularly disclosed in the following description with reference to the accompanying drawings, in which—

Figure 1 is a side elevation with the brush support partly in section;

Fig. 2 is a vertical section through the trolley mechanism showing the lubricating passage to the bearings; and Fig. 3 is a plan view of the lubricator support with the container members removed.

Similar characters of reference are employed to designate the corresponding parts throughout the different views.

The numeral 1 designates the I-beam trolley rail which is conveniently suspended and upon which is mounted a bracket 2, attached by means of bolts 3. The bracket 2 carries a pivot bolt 4 upon which is mounted the pivoted fork member 5 being formed with an extension 6 which carries a downwardly extending bolt 7, for retaining the coil spring 8. The spring 8 bears upon the upper surface of the trolley rail and holds the fork member 5 resiliently in a horizontal position.

Formed integral with the fork member 5 is the downwardly curved arm 9 which is formed with a head 10 to which is bolted a cap member 11, the head 10 and the cap 11 being suitably grooved on their inward faces for securing a brush 12 directly under the outlet 13 of the lubricant container 14 which is retained in the bore 14' of the forked arm 5. The brush 12 is constructed with a central tube 15 through which the lubricant passes to saturate the bristles of the brush.

The trolley wheels 16 are supported by a pair of arms 17 forming a fork to which are attached the studs 18 which are provided with the central bores 19. The rims 20 of the trolley are supported by the bearings 21, the bearings being in suitable bearing races formed upon the studs 18. Oil receiving cups 22 project upwardly from the studs 18 and are connected at their lower ends to the interior bores 19, the bores 19 forming a passage from the spouts 22 to the bearings 21.

The link member 23 is sandwiched between the lower ends of the members 17 and is attached by the bolts 24, and extends downwardly to be connected by the propelling chain 25. At 26 is provided the means for connecting the saggers or baskets for carrying the load.

In operation the trolleys 16 are propelled along the trolley rail 1 by means of the chain 25 until they come under the lubricant containers. The lubricant has been slowly fed by any suitable mechanism through the outlets 13 into the tubes 15 of the brushes, the bristles of which are thereby saturated with the lubricant. The receiving cups 22, which have enlarged bell mouthed ends, wipe a quantity of the lubricant from the bristles of the brush. The lubricant passes through the receiving cups 22 into the central bores 19 of the studs 18 supporting the trolleys and from the bores 19 it passes to the bearings 21 which are thereby effectively lubricated.

In trolley conveyers of considerable length, and in conveyors subject to great heat, the amount of lubrication necessary is variable and may be accommodated by placing a series of lubricating mechanisms at desired intervals upon the trolley rail.

Although a specific embodiment of my invention has been disclosed it will be understood that such variations in the details of construction may be made as fall within the scope of the appended claims.

What I claim is:—

1. A trolley conveyer lubricating device comprising in combination a trolley rail, trolley wheels adapted to be propelled along said rail, a plurality of arms adapted to be connected together by a chain, axles mounted in the upper ends of said arms and adapted to rotatively support said wheels, bearings supported on said axles, a hollow bore formed in each of said axles, oil receiving cups mounted in said arms and said axles and communicating with said hollow bores, oil containers mounted on said rail, and brushes for receiving oil from said containers adapted to be wiped by said receiving cups to supply oil to said hollow bore.

2. A trolley conveyer lubricating device comprising in combination an I beam, trolley wheels mounted on said I beam, axles supported by said wheels, fork arms suspended by said axles, oil receiving cups mounted in said arms and communicating with a hollow bore formed in each of said axles, said bores communicating with the bearings between said wheels and said axles, a bracket mounted on said I beam, a forked arm pivotally mounted on said bracket, oil containers carried by said forked arms, brushes carried by said forked arm and adapted to be saturated with oil from said containers, and means for resiliently holding said forked arm in a position whereby said brushes are wiped by said oil receiving cups as said trolleys move along said I beam.

3. A trolley conveyer lubricating device comprising in combination a trolley rail, trolley wheels adapted to be propelled along said rail, a plurality of arms adapted to be connected together by a chain, axles mounted in the upper ends of said arms and adapted to rotatively support said wheels, bearings supported on said axles, a hollow bore formed in each of said axles, oil receiving cups mounted in said arms and said axles and communicating with said hollow bores, a bracket mounted on said rail, a forked arm pivotally mounted on said bracket, oil containers carried by said forked arms, brushes carried by said forked arm and adapted to be saturated with oil from said containers, and means for resiliently holding said forked arm in a position whereby said brushes are wiped by said oil receiving cups as said trolleys move along said rail.

ALEXIS R. PRIBIL.